United States Patent
Bayens et al.

[11] Patent Number: 6,070,514
[45] Date of Patent: Jun. 6, 2000

[54] PNEUMATIC BRAKE BOOSTER

[75] Inventors: Mark Bayens, Morfelden-Walldorf; Thomas Berthold, Darmstadt; Peter Drott, Frankfurt am Main; Horst Kramer, Dietzenbach, all of Germany

[73] Assignee: Continental Teves AG & CO. OHG, Frankfurt, Germany

[21] Appl. No.: 09/155,167

[22] PCT Filed: Mar. 21, 1997

[86] PCT No.: PCT/EP97/01454

§ 371 Date: Apr. 5, 1999

§ 102(e) Date: Apr. 5, 1999

[87] PCT Pub. No.: WO97/35754

PCT Pub. Date: Oct. 2, 1997

[30] Foreign Application Priority Data

Mar. 23, 1996 [DE] Germany .............. 196 11 555

[51] Int. Cl.[7] ............................................. F15B 13/16
[52] U.S. Cl. ........................................... 91/367; 91/376 R
[58] Field of Search .................. 91/361, 367, 376 R

[56] References Cited

U.S. PATENT DOCUMENTS

| | | |
|---|---|---|
| 5,172,964 | 12/1992 | Levrai et al. . |
| 5,460,074 | 10/1995 | Balz et al. .......... 91/376 R X |
| 5,479,844 | 1/1996 | Heibel et al. ........ 91/376 R X |
| 5,605,088 | 2/1997 | Balz et al. .......... 91/376 R X |
| 5,611,257 | 3/1997 | Eick .................... 91/367 |
| 5,711,202 | 1/1998 | Tsubouchi ............ 91/367 |
| 5,845,556 | 12/1998 | Ysubouchi et al. .... 91/367 |
| 5,873,247 | 2/1999 | Schluter et al. ....... 60/534 |
| 5,937,727 | 8/1999 | Klesen et al. ......... 91/367 |
| 5,979,292 | 11/1999 | Klesen et al. ......... 91/367 |

FOREIGN PATENT DOCUMENTS

| | | |
|---|---|---|
| 0218510 | 4/1987 | European Pat. Off. . |
| 0668201 | 8/1995 | European Pat. Off. . |
| 2208765 | 9/1972 | Germany . |
| 3413739 | 10/1985 | Germany . |
| 3915219 | 11/1990 | Germany . |
| 4238333 | 5/1994 | Germany . |
| 4405076 | 8/1995 | Germany . |
| 195 19 235 | 12/1995 | Germany . |
| WO94/11226 | 5/1994 | WIPO . |

OTHER PUBLICATIONS

Japanese Abstract 2–306870 Published Dec. 20, 1990.
Japanese Abstract 5–178202 Published Jul. 20, 1993.

*Primary Examiner*—John Ryznic
*Attorney, Agent, or Firm*—Rader, Fishman & Grauer PLLC

[57] ABSTRACT

The present invention discloses a brake force booster for automotive vehicles having a control valve which is operable independently of an actuating rod displacing a valve piston, by way of an electromagnet which actuates a third sealing seat. Displacement of the sealing seat in opposition to the actuating direction of the brake force booster permits ventilating the working chamber. To eliminate all pneumatically induced force components in an independent activation, according to the present invention, a permanent pneumatic connection is provided between a pneumatic chamber delimited in the control housing by the valve member and the vacuum chamber, and in that both a second sealing seat which is provided on the valve piston and used to ventilate the working chamber, the third sealing seat, and the valve member in its sealing lip delimiting the pneumatic chamber in the control housing have almost identical diameters.

5 Claims, 3 Drawing Sheets ial activation of the brake force booster especially in control operations. One of the annular surfaces to which a pneumatic differential pressure is applied during the independent activation of the brake force booster produces a force component which counteracts the independent actuating force generated by the electromagnet and tends to close the control valve. This necessitates compensating the force component by an increase of the independent actuating force which must be generated by the electromagnet.

PNEUMATIC BRAKE BOOSTER

TECHNICAL FIELD

This invention generally relates to brake systems and more particularly to a pneumatic brake force booster for automotive vehicles.

BACKGROUND OF THE INVENTION

International patent application WO 94/11226 discloses a brake force booster of this general type. The prior art brake force booster suffers from the disadvantage of the effect of annular surfaces on the valve member of the control valve which are delimited by the second and third sealing seats, on the one hand, and the boundary of the mentioned pneumatic chamber, on the other hand, especially in the event of independent activation by switching on the electromagnets. This condition affects adversely the use of the independently actuatable brake force booster especially in control operations. One of the annular surfaces to which a pneumatic differential pressure is applied during the independent activation of the brake force booster produces a force component which counteracts the independent actuating force generated by the electromagnet and tends to close the control valve. This necessitates compensating the force component by an increase of the independent actuating force which must be generated by the electromagnet.

Therefore, an object of the present invention is to disclose measures which permit eliminating the disturbing effects of the mentioned force component.

According to the present invention, this object is achieved because a permanent pneumatic connection between the pneumatic chamber and the vacuum chamber is provided, and in that both the second and the third sealing seat and the valve member in its part delimiting the pneumatic chamber in the control housing have almost identical diameters which, preferably, range in a tolerance width of 1 mm. It is preferred that the pneumatic chamber is delimited by a cylindrical part which cooperates with a sealing lip designed on the valve member.

In a preferred aspect of the subject matter of the present invention, the valve member has two sealing surfaces which preferably have an annular configuration and are arranged one behind the other in the actuating direction, and the first and the third respectively the second sealing seat are movable into abutment with the sealing surfaces.

The present invention will be explained in detail in the following description of an embodiment, making reference to the accompanying drawings.

DETAILED DESCRIPTION OF THE PREFERRED EMBODIMENTS

Figure 1:
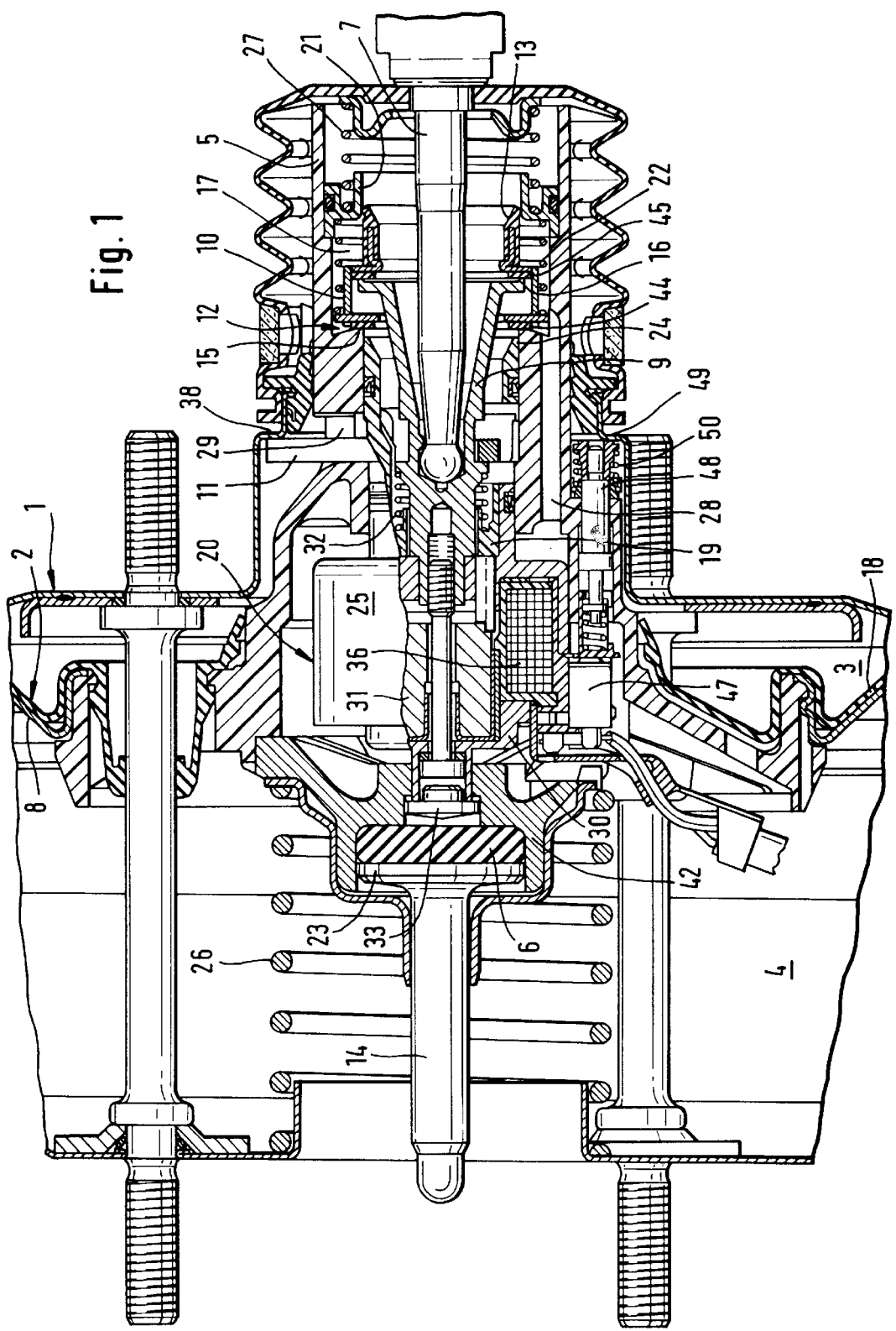
FIG. 1 is a longitudinal cross-sectional view, partly broken off, of a design of the brake force booster of the present invention in the inactive stand-by position.

The booster housing 1 (represented only schematically) of the vacuum brake force booster of the present invention which is shown in the drawing is subdivided by an axially movable wall 2 into a working chamber 3 and a vacuum chamber 4. The axially movable wall 2 includes a diaphragm plate 8, deep drawn from sheet metal, and a flexible diaphragm 18 (not shown) abutting on the plate. The diaphragm, configured as a rolling diaphragm, provides a sealing between the outside periphery of the diaphragm plate 8 and the booster housing 1.

A control valve 12 is operable by an actuating rod 7 and accommodated in a control housing 5, which is sealed and guided in the booster housing 1 and carries the movable wall 2. The control valve 12 is composed of a first sealing seat 15 provided on the control housing 5, a second sealing seat 16 provided on a valve piston 9 connected to the actuating rod 7, and a valve member 10 which cooperates with the two sealing seats 15, 16. Valve member 10 is guided in a guide part 21 sealed in control housing 5 and is urged to press against the valve seats 15, 16 by a valve spring 22 that is supported on the guide part 21. The working chamber 3 is connectable to the vacuum chamber 4 through a channel 28 which extends laterally in the control housing 5.

By way of a rubber-elastic reaction disc 6 which abuts on the frontal end 42 of the control housing 5 and a push rod 14 which includes a head flange 23, the brake force is transmitted to an actuating piston of a non-illustrated master cylinder of the brake system. The master brake cylinder is mounted on the vacuum-side booster housing half.

A resetting spring 26 (shown schematically in the drawing) is supported on the vacuum-side end wall of the booster housing 1 and maintains the movable wall 2 in the initial position shown. In addition, a second compression spring or piston-rod return spring 27 is provided which is supported indirectly on the actuating rod 7, on the one hand, and on the guide part 21, on the other hand. The force of the spring 27 ensures a bias of the valve piston 9 or its sealing seat 16 in relation to the valve member 10.

To connect the working chamber 3 to the atmosphere when the control valve 12 is actuated, a channel 29 which extends in a generally radial direction is provided in the control housing 5. The return movement of the valve piston 9 at the end of a braking operation is limited by a transverse member 11 which, in the release position of the vacuum brake power booster shown in the drawing, abuts on a stop 38 provided in the booster housing 1.

As can further be seen in the drawing, the valve member 10 has a cylindrical design and includes an annular first sealing surface 44 which cooperates with the first sealing seat 15. Valve member 10 further includes an annular second sealing surface 45 which cooperates with the second sealing seat 16. Both sealing surfaces are arranged one behind the other in the actuating direction of the brake force booster and have identical diameters. Further, the valve member 10 has a radially inwardly arranged sealing lip 13 on its end remote from the sealing seats 15, 16. In the assembled condition of the valve member 10 in the control housing 5, sealing lip 13 sealingly bears against the above-mentioned guide part 21, thereby delimiting a pneumatic chamber 17 in the control housing 5. The above mentioned channel 28 preferably connects the pneumatic chamber 17 to the vacuum which is arranged on the side of the valve member 10 remote from the sealing surfaces 44 and 45, is permanently exposed to the effect of the vacuum that prevails in the vacuum chamber 4.

To initiate independent activation of the brake force booster of the present invention irrespective of the actuating rod 7, a third sealing seat 24 is arranged coaxially to the sealing seats 15, 16. The diameter of sealing seat 24 corresponds to that of the second sealing seat 16 and to that of the sealing lip 13 which delimits the pneumatic chamber 17. The third sealing seat 24 is operable by way of an electromagnet 20 which is favorably accommodated in a housing 25, rigidly connected to the valve piston 9, and accordingly is displaceable along with the valve piston 9 in the control housing 5. The electromagnet 20 includes a coil 36 accommodated within the housing 25 and an axially slidable cylindrical armature 31. Armature 31 is partly guided in a closure member 30 closing the housing 25. A force-transmitting sleeve 19 which carries the above-mentioned third sealing seat 24 is supported on armature 31. Interposed between the valve piston 9 and the force-transmitting sleeve 19 is a compression spring 32 which maintains the armature 31 in its initial position where the third sealing seat 24 is axially offset with respect to the second sealing seat 16 provided on the valve piston 9. The closure member 30 guided in the control housing 5, by the intermediary of a transmission disc 33, bears against the above mentioned reaction disc 6 and permits transmitting the input force introduced on the actuating rod 7 to the reaction disc 6.

In the design of the brake force booster of the present invention shown in the drawing, electrical switching means 47, 48 are provided which are important especially in braking operations where the electromagnet 20 is actuated in addition to the activation by the driver in order to produce full braking irrespective of the driver's wish (so-called brake assistant function). It is particularly significant that the switching means 47, 48 are actuated during each braking operation. It must be ensured simultaneously that the electromagnet 20 is reliably deactivated upon completion of the braking operation assisted by independent force. The switching means shown include a microswitch 47 which has two switch positions and is preferably attached to the valve piston 9 or the housing 25 of the electromagnet 20. The switching means further include an actuating element 48 which actuates the microswitch 47 by a translatory movement, is sealed and guided in a bore in the control housing 5 and cooperates with a stop on the booster housing. The stop is assigned reference numeral 49 and can be formed by a radial collar of the rear booster housing half, for example. A compression spring 50 is interposed between the actuating element 48 and the control housing 5 so that the end of the actuating element 48 remote from the microswitch 47 abuts with preload on the stop 49.

The operation of the independently operable brake force booster described and illustrated herein is precisely disclosed in the above-mentioned international patent application. This obviates the need for a repetition in the present text.

Figure 2:
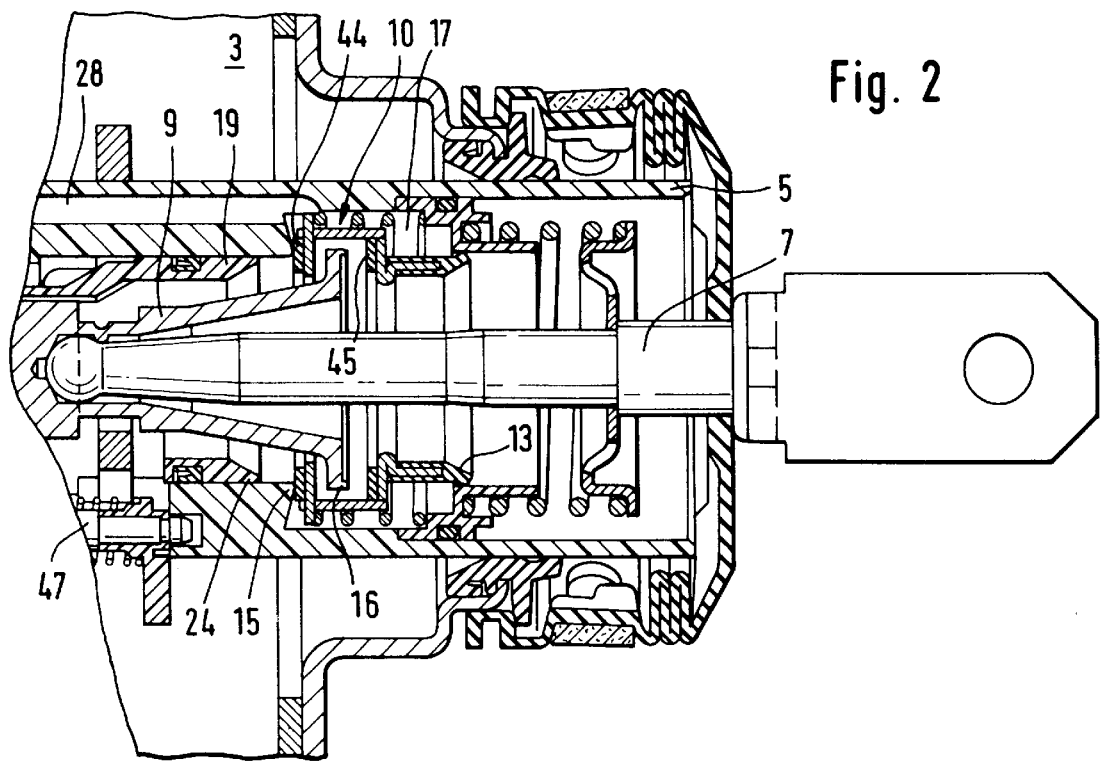
FIG. 2 is a view of the control assembly of the brake force booster of FIG. 1 in the full braking position controlled by the driver.

In a full braking position initiated by a driver's actuation, as shown in the FIG. 2 embodiment, the first sealing surface 44 is in abutment on the first sealing seat 15, thereby interrupting the connection between the two chambers 3, 4 of the brake force booster. Displacement of the valve piston 9 in the actuating direction produces a slot between the second sealing surface 45 and the second sealing seat 16 provided on the valve piston 9. The slot permits the atmosphere to enter into the working chamber 3 and, thus, the build-up of a pneumatic pressure differential in the booster housing 1.

Figure 3:
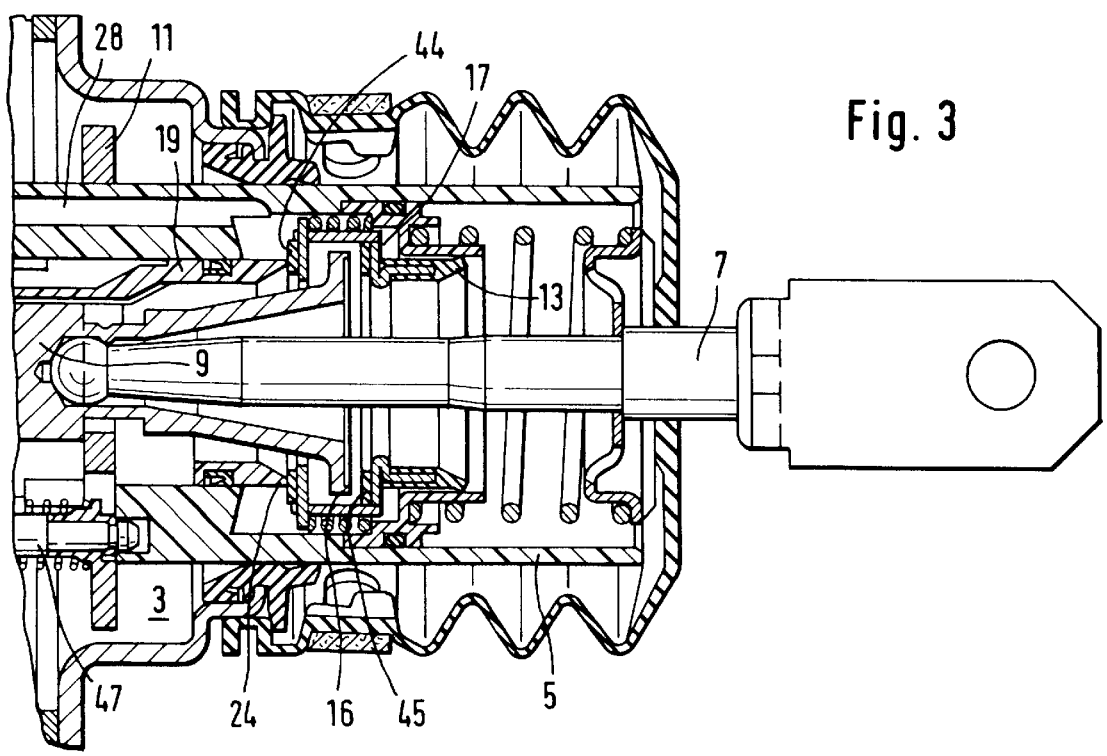
FIG. 3 is a view of the control assembly of the brake force booster of FIG. 1 in the release position, with the electromagnet switched.

FIG. 3 shows the condition which occurs after removal of the actuating force by the driver, when the electromagnet 20 is switched on. In this condition, the function of the first sealing seat 15 is adopted by the third sealing seat 24 which has simultaneously displaced the valve member 10 in opposition to the actuating direction, with the result that braking initiated by the driver has been assisted. Removal of the actuating force or the driver's wish for termination of braking is identified by the above-mentioned electrical switching means 47, 48 (so-called release switch) which cause deactivation of the electromagnet 20. The sleeve 19 returns into its initial position under the effect of the compression spring 32 so that both the second sealing seat 16 provided on the valve piston 9 and the first sealing seat 15 provided on the control housing 5 can be closed.

A configuration of the control valve 12 of the independently actuatable brake force booster according to the present invention, especially by providing the two sealing seats 15, 16 and the sealing lip 13 with identical diameters, prevents pneumatically induced force components from becoming operative upon independent activation of the control valve 12 by the electromagnet 20. This is because the effects of the pneumatic pressure differential on the valve member 10 are balanced. Other embodiments of the valve member 10 are, of course, also possible. Instead of the sealing lip 13 on the valve member 10, a rolling diaphragm can be used which serves to connect the valve member 10 to the guide part 21.

Figure 4:
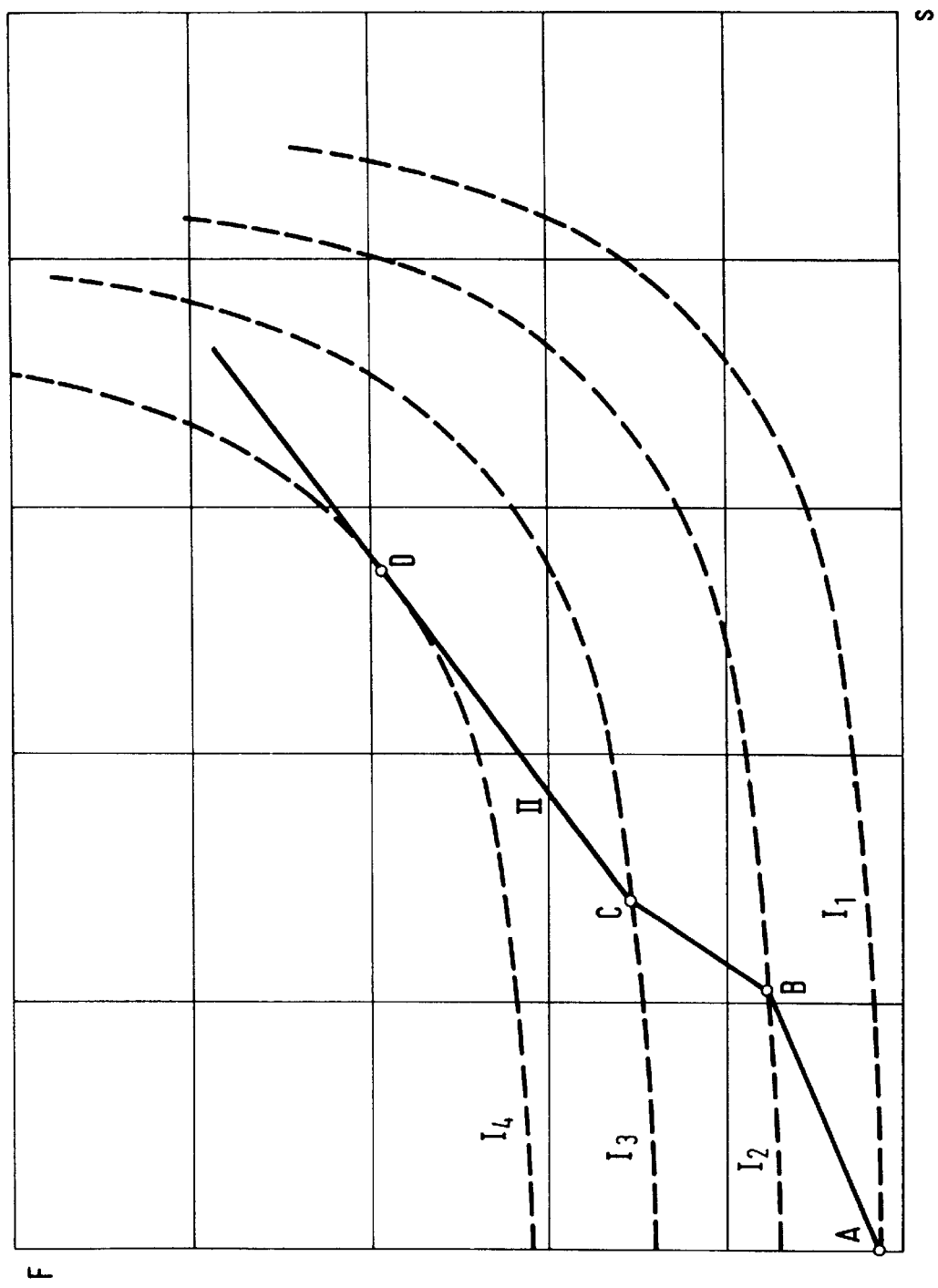
FIG. 4 is a diagram showing the force-and-travel characteristic curves of the system illustrated in FIGS. 1 to 3.

The diagram illustrating the force-travel characteristic curves in FIG. 4 shows the influence of the rating of spring 32 which biases the sleeve 19. As can be taken from the drawing, the variation designated by $I_1$ shows a force-travel characteristic curve of the electromagnet 20 when actuated by a first current value, and the variations characterized by $I_{2,3,4}$ correspond to a second, third and fourth force-travel characteristic curve of the electromagnet 20 when said is actuated by a second, third and fourth current value. The variation characterized by II finally represents the behavior of the consumer system which consists of the armature 31 of the electromagnet 20, the spring 32, the sleeve 19, the valve member 10 and the valve spring 22. The first portion AB of the characteristic curve II shows the effect of the compression spring 32 between the sleeve 19 and the valve piston 9. The force of spring 32 must be overcome before the third sealing seat 24 moves into abutment on the first sealing surface 44 of the valve member 10. The second portion BC which corresponds to a pneumatic maintaining phase, shows a rise in the force to be generated by the electromagnet 20, by which the third sealing seat 24 is urged into the material of the sealing surface 44 until displacement of the valve member 10 in opposition to the force of the valve spring 22 and, thus, pressure increase in the system commences in the point of intersection C of characteristic curve II with the variation $I_3$. The section CD corresponds to a zone where the consumer system is stabely adjustable by changes of the current values between $I_3$ and $I_4$ being conducted to the electromagnet 20. That means, a defined slot can be adjusted between the second sealing seat 16 and the second sealing surface 45 of the valve member 10 and, thus, a defined gradient of the pneumatic pressure can be adjusted which prevails in the working chamber 3. The point of contact D of the force-travel characteristic curve $I_4$ with the consumer characteristic curve II simultaneously represents the transition between the stable pressure increase zone and an unstable zone where the force-travel characteristic curve $I_4$ of the electromagnet 20 exhibits a considerably greater gradient than the consumer characteristic curve II, and where the driver is assisted in panic stops (so-called brake assistant function). A stable pressure increase occurs in the zone BA of the consumer characteristic curve II where the electromagnet 20 is furnished with current values between $I_1$ and $I_2$.

List of Reference Numerals 1 booster housing
2 movable wall 3 working chamber
4 vacuum chamber
5 control housing
6 reaction disc
7 actuating rod
8 diaphragm plate
9 valve piston
10 valve member
11 transverse member
12 control valve
13 sealing lip
14 push rod
15 sealing seat
16 sealing seat
17 chamber
18 rolling diaphragm
19 sleeve
20 electromagnet
21 guide part
22 valve spring
23 head flange
24 sealing seat
25 housing
26 resetting spring
27 piston-rod return spring
28 channel
29 channel
30 closure member
31 armature
32 spring
33 transmission disc
34 chamber
35 extension
36 coil
37 surface
38 stop
39 channel
40 spring
41 sealing lip
42 front part
43 annular chamber
44 sealing surface
45 sealing surface
46 coil
47 microswitch
48 actuating element
49 stop
50 spring

What is claimed is:

1. Pneumatic brake force booster for automotive vehicles, comprising:

a booster housing having its interior subdivided by a movable wall into a first chamber (vacuum chamber) and a second chamber (working chamber), a control housing accommodating a control valve that controls a pneumatic pressure differential which acts upon the movable wall, the control valve including a first sealing seat that is provided on the control housing, a second sealing seat provided on a valve piston, and a third sealing seat provided on a sleeve, the sealing seats interacting with a valve member, wherein the control valve is operable by both an actuating rod and by an electromagnet independently of the actuating rod wherein the armature of the electromagnet is in force-transmitting interaction with the third sealing seat, wherein the valve member delimits a pneumatic chamber in the control housing on its side remote from the sealing seats, wherein a permanent pneumatic connection exists between the pneumatic chamber and the vacuum chamber, wherein the second and the third sealing seat and the sealing lip of the valve member have substantially identical diameters.

2. Brake force booster as claimed in claim 1, wherein the diameters of the second and the third seats and the sealing lip of the valve member all fall within a tolerance width of 1 mm of one another.

3. Brake force booster as claimed in claim 1, wherein the pneumatic chamber is delimited by a cylindrical guide part which cooperates with said sealing lip of said valve member.

4. Brake force booster as claimed in claim 1, wherein the pneumatic chamber is delimited by a cylindrical part to which the valve member is connected by way of a rolling diaphragm having a mean diameter which corresponds to that of the first and the third sealing seat.

5. Brake force booster as claimed in claim 1, wherein the valve member has two sealing surfaces which preferably have an annular configuration and are arranged one behind the other in the actuating direction, and the first and the third respectively the second sealing seat are movable into abutment with the sealing surfaces.

* * * * *